(12) United States Patent
Abedi

(10) Patent No.: US 8,023,450 B2
(45) Date of Patent: Sep. 20, 2011

(54) METHOD FOR SCHEDULING UPLINK TRANSMISSIONS FROM USER EQUIPMENTS BY A BASE STATION DETERMINING A MEASURE OF A QUALITY OF SERVICE, AND CORRESPONDING BASE STATION, USER EQUIPMENT AND COMMUNICATION SYSTEM

(75) Inventor: Saied Abedi, Berkshire (GB)

(73) Assignee: Fujitsu Limited, Kawasaki (JP)

( * ) Notice: Subject to any disclaimer, the term of this patent is extended or adjusted under 35 U.S.C. 154(b) by 687 days.

(21) Appl. No.: 10/565,709

(22) PCT Filed: Oct. 1, 2004

(86) PCT No.: PCT/GB2004/004179
§ 371 (c)(1),
(2), (4) Date: Jan. 24, 2006

(87) PCT Pub. No.: WO2005/034443
PCT Pub. Date: Apr. 14, 2005

(65) Prior Publication Data
US 2007/0110000 A1    May 17, 2007

(30) Foreign Application Priority Data

Oct. 3, 2003    (GB) .................................. 0323244.4

(51) Int. Cl.
*H04W 4/00*    (2009.01)
*H04B 7/212*    (2006.01)

(52) U.S. Cl. ......... 370/328; 370/329; 370/332; 370/348

(58) Field of Classification Search .......... 370/230–235, 370/237–238, 338, 395.42, 431–432, 443–444, 370/455, 252, 327–333, 340–350, 395.21; 455/132–135, 428, 432.3, 445, 448–451, 455/452.1–452.2, 453, 466, 509, 512–517, 455/524–525, 550.1, 561, 556.2
See application file for complete search history.

(56) References Cited

U.S. PATENT DOCUMENTS 6,047,000 A * 4/2000 Tsang et al. .................. 370/412
6,400,699 B1    6/2002 Airy et al.
(Continued)

FOREIGN PATENT DOCUMENTS

EP    1 227 626    7/2002
(Continued)

OTHER PUBLICATIONS

International Preliminary Report on Patentability and the Written Opinion of the International Searching Authority dated Apr. 13, 2006.

(Continued)

*Primary Examiner* — Meless N Zewdu
(74) *Attorney, Agent, or Firm* — Katten Muchin Rosenman LLP

(57) ABSTRACT

A method of transmitting data packets in an uplink from a plurality of source user equipments to a base station, the data packets being for onward transmission to a plurality of destination user equipments, is disclosed. The method comprising the steps of determining a measure of a quality of service from the base station to a destination user equipment, and scheduling uplink transmissions from the source user equipments to the base station in dependence on the measure of a quality of service.

33 Claims, 12 Drawing Sheets

U.S. PATENT DOCUMENTS

| | | | |
|---|---|---|---|
| 6,728,208 B1 * | 4/2004 | Puuskari | 370/230.1 |
| 6,889,050 B1 * | 5/2005 | Willars et al. | 455/452.2 |
| 6,987,738 B2 * | 1/2006 | Subramanian et al. | 370/252 |
| 7,020,110 B2 * | 3/2006 | Walton et al. | 370/334 |
| 7,336,632 B2 * | 2/2008 | Cheng et al. | 370/329 |
| 7,373,420 B1 * | 5/2008 | Lyon | 709/235 |
| 7,403,892 B2 * | 7/2008 | Sjoberg et al. | 704/201 |
| 2002/0080719 A1 * | 6/2002 | Parkvall et al. | 370/235 |
| 2002/0094778 A1 * | 7/2002 | Cannon et al. | 455/41 |
| 2002/0155853 A1 * | 10/2002 | Lee et al. | 455/522 |
| 2002/0183066 A1 | 12/2002 | Pankaj | |
| 2003/0045288 A1 * | 3/2003 | Luschi et al. | 455/434 |
| 2003/0103514 A1 * | 6/2003 | Nam et al. | 370/412 |
| 2003/0124988 A1 | 7/2003 | Bae et al. | |
| 2003/0166408 A1 * | 9/2003 | Zhang et al. | 455/522 |
| 2003/0169709 A1 * | 9/2003 | Oki | 370/335 |
| 2003/0169746 A1 * | 9/2003 | Kitazawa et al. | 370/395.42 |
| 2003/0185155 A1 * | 10/2003 | Huang et al. | 370/235 |
| 2004/0147276 A1 * | 7/2004 | Gholmieh et al. | 455/522 |
| 2004/0196804 A1 * | 10/2004 | Love et al. | 370/329 |
| 2005/0047393 A1 * | 3/2005 | Liu | 370/352 |

FOREIGN PATENT DOCUMENTS

| | | |
|---|---|---|
| EP | 1 317 110 | 6/2003 |
| GB | 0303859.3 | 2/2003 |
| GB | 2 390 775 | 1/2004 |
| GB | 2 390 779 | 1/2004 |
| JP | 2001-516975 | 10/2001 |
| JP | 2002-300629 | 10/2002 |
| JP | 2003-102066 | 4/2003 |
| WO | 99/09779 | 2/1999 |
| WO | WO 01/52588 | 7/2001 |
| WO | WO 2004/075569 | 9/2004 |

OTHER PUBLICATIONS

International Search Report dated Jan. 17, 2005.
United Kingdom Search Report dated Feb. 17, 2004.
Saied Abedi, et al. Hybrid Genetic Packet Scheduling and Radio Resource Management for High Speed Downlink Packet Access. VPMC 2002 Conference, Oct. 27-30, 2002.
3GPP TSG-RAN WG1#31, EUDTCH Scheduling Considerations and Text Proposal for TR 25.896.
F. Khan. A Novel Technique for High Speed Uplink Data Transmission in 3g Systems.
Saied Abedi, et al. A Radio Aware Random Iterative Scheduling Technique for High Speed Downlink Packet Access. VTC Fall 2002 Conference, Sep. 24-28, 2002.
Saied Abedi, et al. On the Performance of Hybrid Genetic Packet Scheduling and Channel Assignment under Imperfect Reporting Conditions in HSDPA System. IST Mobile and Wireless Telecommunications Sumit, Jun. 15-18, 2003.
Japanese Office Action dated Nov. 4, 2009, from the corresponding Japanese Application.

* cited by examiner

METHOD FOR SCHEDULING UPLINK TRANSMISSIONS FROM USER EQUIPMENTS BY A BASE STATION DETERMINING A MEASURE OF A QUALITY OF SERVICE, AND CORRESPONDING BASE STATION, USER EQUIPMENT AND COMMUNICATION SYSTEM

CROSS-REFERENCE TO RELATED APPLICATION

This application is the National Stage of International Application No. PCT/GB2004/004179, filed Oct. 1, 2004, which claims the benefit under 35 U.S.C. 119(a-e) of GB 0323244.4 filed Oct. 3, 2003, which is herein incorporated by reference.

FIELD OF THE INVENTION

The present invention relates to techniques for scheduling of uplink transmissions in wireless communications systems. The present invention is particularly, but not exclusively, applicable to code division multiple access (CDMA) communications systems such as 3G mobile communications systems.

DESCRIPTION OF RELATED ART

FIG. 1 shows parts of a wireless communications system, in which a plurality of source user equipments UE1, UE2, UE3 are in communication with a plurality of destination user equipments UE4, UE5, UE6 via a base station BS. Source UEs UE1, UE2, UE3 transmit data packets in an uplink to the base station BS. Base station BS receives the data packets from the source UEs and buffers these data packets for onward transmission in a downlink to the destination UEs. In this example, each wireless channel is allocated a separate channelisation code in order to distinguish that channel from the other channels (CDMA).

In the system of FIG. 1, the base station is responsible for scheduling the packets which are to be transmitted to the various destination UEs. The base station is able to make the appropriate scheduling decisions because it is solely responsible for transmitting to the destination UEs. However, it is also necessary for some mechanism to be provided for determining when and how each of the source UEs is to transmit its data in the uplink to the base station.

In the simplest case, each source UE transmits whenever it has data to send. This technique may work well when there are low offered loads on the uplink. However, if too many UEs try to transmit data at the same time, the interference levels may become unacceptable, resulting in poor quality of service.

Various techniques are known for scheduling of uplink transmissions. The aim of these scheduling techniques is to manage the way in which the UEs transmit to the base station in order to meet certain criteria, such as interfere levels, fairness or throughput.

In one scheduling technique, known as time scheduling, a single UE is given the full uplink resources for a given period of time. Some mechanism is implemented for determining which UE has the channel resources at any one time. For example, each UE may take it in turns to transmit its data, or else the UE which is given the channel resources may be selected by taking into account the channel quality.

In time scheduling, only one UE transmits at any one time, and so each UE can transmit within its time window at a high data rate, without causing interference to other UEs. However, time scheduling is inefficient in terms of throughput in the uplink due to the delays involved in informing each UE when it can transmit. Other disadvantages of time scheduling include loss of interference diversity (which increases the interference caused to adjacent cells), less accurate power control, due to less frequent power control signals, and wasted uplink capacity when a UE has little to transmit.

In another scheduling technique, known as rate scheduling, each UE decides on the rate at which it transmits data based on information which is signalled to it by the network. For example, in 3 G communications systems, each UE may decide its rate based on information from the Transport Format Combination Set (TFCS) signalled to it by the radio network controller (RNC). This rate is usually less than the UE's maximum rate, and is set to ensure that interference remains within acceptable levels.

An advantage of rate scheduling is that, since many UEs are transmitting, interference diversity is maintained, which reduces interference to neighbouring cells. Rate scheduling also provides the advantage that call admission and power control mechanisms are more accurate than for time scheduling. However, rate scheduling suffers from the disadvantage that the UEs will each interfere with each other, since many UEs may be transmitting simultaneously.

SUMMARY OF THE INVENTION

It is an aim of the present invention to improve on the known uplink scheduling techniques.

In accordance with a first aspect of the present invention there is provided a method of transmitting data packets in an uplink from a plurality of source user equipments to a base station, the data packets being for onward transmission to a plurality of destination user equipments, the method comprising the steps of:

determining a measure of a quality of service from the base station to a destination user equipment; and scheduling uplink transmissions from the source user equipments to the base station in dependence on the measure of a quality of service.

By using knowledge of the quality of service from the base station to the destination user equipments when scheduling uplink transmission, it has been found that the overall performance of the entire system can be improved.

Since the base station is responsible for transmitting data to the destination user equipments, it may be in the best position to determine the measure of a quality of service. Therefore the measure of a quality of service may be determined at the base station. The base station may transmit an indication of the quality of service to the user equipments, to enable the user equipments to schedule the uplink transmissions. Alternatively, the base station may transmit to a user equipment an indication of a transmission format to be used by the user equipment. For example, the base station may transmit a rate and/or time (e.g. waiting time) of packet transmission to the user equipment.

Preferably the base station determines a measure of a quality of service for each of the plurality of destination user equipments. This can allow the base station to determine how well each link to a destination user equipment is performing in relation to the other links. This information can then be used in scheduling the uplink transmissions.

In a preferred embodiment, the base station determines a credit value for each destination user equipment, the credit value being based on the measures of the quality of service, and the base station transmits each credit value to the corresponding source user equipment. Each user equipment can then schedule its uplink transmissions to the base station in dependence on the credit value.

The credit value for each destination user equipment may be obtained by comparing the measure of the quality of service for that destination user equipment with measures of the quality of service for other destination user equipments. This can allow a source user equipment to have an indication of how well its link through to the destination user equipment is performing in comparison to other such links. This information can then be used in scheduling uplink transmissions.

In order to have a good indication of the quality of service, a plurality of different measures of a quality of service may be determined for each of the plurality of destination user equipments. For example, at least one of the following measures of the quality of packet delivery from the base station to a destination user equipment may be determined: throughput ratio; ratio of satisfied packets; and base station buffer occupancy. Other measures could be used as well as or instead of these measures.

The base station may compare each of the measures of the quality of service for that destination user equipment with the corresponding measures of the quality of service for other destination user equipments, to give a plurality of relative measures. For example, the base station may obtain at least one of the following relative measures: distance from average throughput ratio; distance from minimum throughput ratio; distance from minimum quality of service; and distance from minimum buffer length. Other relative measures could be used as well as or instead of these measures; for example, the number of retransmission requests received by the base station from a destination user equipment could be used as well as or instead of any of the above measures.

In a particularly advantageous implementation of the present invention, where there are a plurality of relative measures for each destination user equipment, the base station combines the plurality of relative measures for each destination user equipment to give a single credit value for that destination user equipment. The advantage of combining a plurality of relative measures in this way is that a single value is obtained, which reduces the amount of information which needs to be transmitted to the source user equipments. Such a single credit value gives an indication of how well a particular link to a destination user equipment is performing in comparison to the other such links based on at least two different measurements of downlink quality. The single credit value may be, for example, one or two bytes. Each single credit value is preferably transmitted to the corresponding source user equipment, for example, in a control channel or in a data channel, or by some other means.

Alternatively, two or more credit values or relative measures may be transmitted to each source user equipment.

Preferably, a source user equipment receives a credit value based on the measure of the quality of service, and determines a time and/or rate of packet transmission based on the credit value. The source user equipment may determine the time and/or rate of packet transmission based additionally on a measurement of radio channel conditions, which it may determine itself, or receive from the base station or the network or elsewhere. The source user equipment may also determine the time and/or rate of packet transmission based additionally on the type of service. In general, user equipments transmitting services with a higher priority or which are more time critical may be allowed to more often or at a greater rate than services with a lower priority or which are less time critical. For example, video services may be given greater priority than web pages.

The uplink transmissions may be scheduled using rate scheduling, or they may be scheduled using hybrid rate-time scheduling. Hybrid rate-time scheduling may be preferred in some circumstances because of the greater flexibility which it offers. For example, it can allow a poorly performing user equipment to recover quickly by allowing it to transmit on its own or with few other user equipments for a certain period of time. However, in other circumstances hybrid rate-time scheduling may not be appropriate; for example the delays which may result in some channels may not be tolerated by the power control mechanism. Therefore the method may also include a step of switching from one to the other of rate scheduling and hybrid rate-time scheduling. The decision to switch from one to the other may be based on some measure of a system parameter, such as a measure of whether power control is being performed within acceptable parameters, or whether interference diversity is within acceptable levels.

In one example the rate of uplink transmission may be varied by adjusting the modulation and coding scheme level. In other example the rate of uplink transmission is varied by adjusting the intervals at which the uplink transmissions take place. A user equipment may also increase its rate of uplink transmissions by adapting its spreading code, or by occupying two or more channels. Any other appropriate technique for varying the rate of uplink transmission could be used as well or instead of these techniques.

Preferably a source user equipment receiving an indication of a good quality of service transmits data packets to the base station at a lower rate than would otherwise be the case (assuming that all other factors are equal). A source user equipment receiving an indication of a poor quality of service may transmit data packets to the base station at a higher rate than would otherwise be the case. In this way a user equipment which is performing well can sacrifice some of its capacity in order to allow a poorly performing user equipment to recover. For example, if base station buffer occupancy is the or a factor used in producing the credit value, then a user equipment which has a relatively full buffer at the base station (i.e. which has many of its data packets waiting at the base station for onward transmission) may reduce its rate of transmission in order to allow a user equipment with a lower base station buffer occupancy to transmit at a higher rate and thus improve its base station buffer occupancy.

A source user equipment which receives credit values based on measures of the quality of service may store a history of the credit values. The history of credit values may be used in making decisions about uplink scheduling. For example, a user equipment with a worsening history of credit values may transmit data packets to the base station at a higher rate than would otherwise be the case, while a user equipment with an improving history of credit values may transmit data packets to the base station at a lower rate than would otherwise be the case.

The base station preferably operates a scheduling mechanism for downlink transmissions. The downlink scheduling mechanism may be, for example, Hybrid Genetic Packet Scheduling (HGPS), as described in co-pending United Kingdom patent application number 0216245.1 in the name of Fujitsu Limited, the entire contents of which are incorporated herein by reference, and as also described in the paper "Hybrid Packet Scheduling and Radio Resource Management for High Speed Downlink Packet Access" Abedi et al, WPMC 2002 Conference, 27-30 Oct. 2002, the entire contents of which are incorporated herein by reference. As another example, the downlink scheduling mechanism may be Multidimensional Quality of Service Based Packet Scheduler (MQPS), as described in co-pending United Kingdom patent application number 0303859.3 in the name of Fujitsu Limited, the entire contents of which are incorporated herein by reference. As a further example, the downlink scheduling mechanism may be Random Iterative Hybrid Packet Scheduler (RIHS), as described in co-pending United Kingdom patent application number 0216239.4 in the name of Fujitsu Limited, the entire contents of which are incorporated herein by reference.

In one embodiment the base station transmits the data packets directly to the plurality of destination user equipments. In another embodiment the base station transmits the data packets to the plurality of destination user equipments via a network, such as a radio network subsystem, a core network, a public switched telephone network, or an IP-based network. In this case another base station may be responsible for the actual transmission of the data packets to the destination user equipments.

Preferably a new credit value is periodically determined and sent to the source user equipment.

According to a second aspect of the present invention there is provided a base station for receiving data packets in an uplink from a plurality of source user equipments for onward transmission to a plurality of destination user equipments, the base station comprising:
  means for determining a measure of a quality of service from the base station to a destination user equipment;
  means for producing a credit value based on the measure of the quality of service; and
  means for transmitting the credit value to a source user equipment.

According to a third aspect of the invention there is provided a base station for receiving data packets in an uplink from a plurality of source user equipments for onward transmission to a plurality of destination user equipments, the base station comprising:
  means for determining a measure of a quality of service from the base station to a destination user equipment;
  means for determining, based on the measure of a quality of service, a transmission format to be used by a user equipment in scheduling uplink transmissions from the user equipment to the base station; and
  means for transmitting to the user equipment an indication of the transmission format to be used by the user equipment.

The base station of the second or third aspect may be adapted to carry out and/or comprise means for carrying out any of the methods of the first aspect.

According to a fourth aspect of the invention there is provided a user equipment for transmitting data packets in an uplink to a base station for onward transmission to a plurality of destination user equipments, the user equipment comprising:
  means for receiving from the base station a credit value, the credit value being an indication of the quality of service from the base station to a destination user equipment; and
  means for scheduling uplink transmissions from the user equipment to the base station in dependence on the credit value.

The user equipment may be adapted to carry out and/or comprise means for carrying out any of the methods of the first aspect.

The invention also provides a communications system comprising a base station according to the second or third aspect and a plurality of user equipments according to the third aspect.

According to another aspect of the present invention there is provided a base station which receives data packets in an uplink from a plurality of source user equipments for onward transmission to a plurality of destination user equipments, the base station comprising:
  a processing unit which determines a measure of a quality of service from the base station to a destination user equipment and which produces a credit value based on the measure of the quality of service; and
  a transmitter which transmits the credit value to a source user equipment.

According to a further aspect of the invention there is provided a user equipment which transmits data packets in an uplink to a base station for onward transmission to a plurality of destination user equipments, the user equipment comprising:
  a receiver which receives from the base station a credit value, the credit value being an indication of a quality of service from the base station to a destination user equipment; and
  a processing unit which schedules uplink transmissions from the user equipment to the base station in dependence on the credit value.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet web site, or it could be in any other form.

Preferred features of the present invention will now be described, purely by way of example, with reference to the accompanying drawings, in which:—

DETAILED DESCRIPTION OF THE INVENTION

First Embodiment

Figure 1:
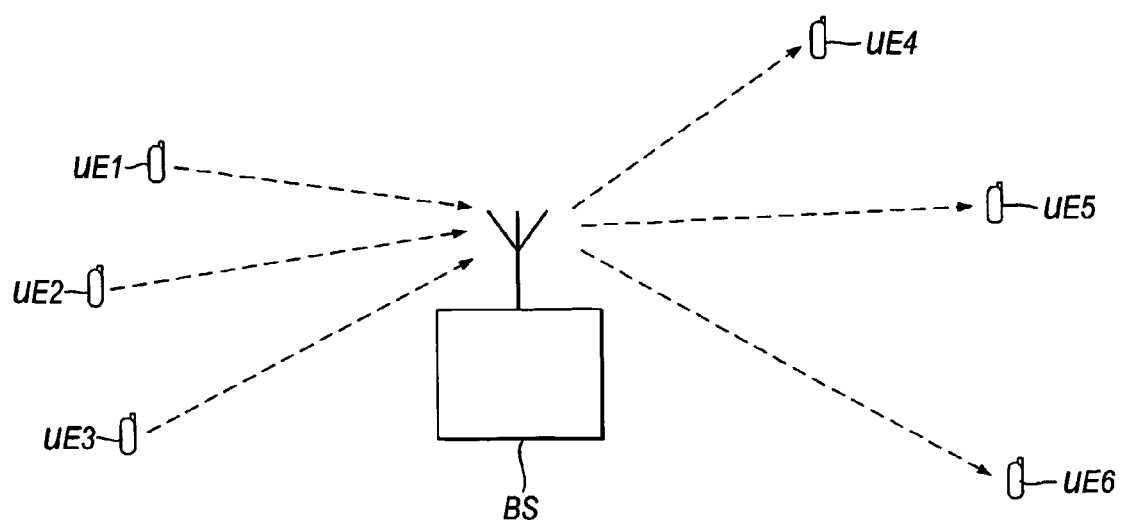
FIG. 1 shows parts of a wireless communications system.

In a first embodiment of the invention, a base station receives data packets from a plurality of UEs and buffers them for onward transmission to a plurality of source UEs. Data packets are stored on a first-in-first-out (FIFO) basis. The base station operates a downlink scheduling mechanism, such as HGPS referred to above, in order to schedule the transmission of the data packets to the source UEs. Downlink transmission takes place using, for example, High Speed Downlink Packet Access (HSDPA). In this technique a plurality of channels are available for transmitting the data, each channel having a different channelisation code. Downlink transmissions are divided up into a series of transmission time intervals (TTI), and a packet of data is transmitted on each different available channel to a selected UE. A new choice of which UE is served by which channel can be made in each TTI. Further details of HSDPA may be found in United Kingdom patent application number 0216239.4, referred to above.

In the present embodiment, the base station together with the source UEs are also responsible for scheduling the data packets transmitted in the uplink from the source UEs to the base station. To achieve this, the base station monitors various quantities which are related to the quality of service of the transmissions in the downlink to each of the destination UEs and calculates a credit value for each UE. Each credit value is transmitted to the respective source UE for use in controlling uplink scheduling.

In the present embodiment the follow three quantities related to the quality of service to the destination UEs are monitored:
1. throughput ratio
2. ratio of satisfied packets
3. base station buffer occupancy 1. Throughput Ratio When the base station receives a data packet from a source UE, it stores that data packet in a buffer for transmission to the destination UE. If that data packet is not transmitted to the destination UE within a certain time, or within a certain number of attempts, then the data packet is dropped from the buffer and never gets delivered. This situation arises if there is heavy competition for the downlink channels and the base station is making scheduling decisions which result in not all of the packets being transmitted. The throughput ratio for a particular UE is the number packets which are successfully delivered to the destination UE divided by the number of packets intended for that UE which are received by the base station.

For the nth UE the throughput ratio is defined as $$Th_n(m) = \frac{(Oct_{Received}(m))_n}{(Oct_{Arrived\_Node\_B}(m))_n}, n = 1 \ldots N \quad (1)$$

where N is the total number of the source UEs in the uplink and m represents the number of the scheduling event (e.g. the Transfer Time Interval), $OCt_{Received}(m)$ is the number of successfully delivered packet data units or octets to the nth destination UE at downlink and $(Oct_{Arrived\_Node\_B}(m))_n$ represents the number of intended octets to the nth destination UE, sent by the corresponding UE and saved in the FIFO buffer at the base station (Node-B).

2. Ratio of Satisfied Packets

For many services a tolerance threshold is set for the total transmission time from the source UE to the destination UE. For example, video services may have a tolerance threshold of 100 ms. If a packet does not arrive at the destination UE within this time, then it is dropped by the destination UE, and is classified as a failed packet. The ratio of satisfied packets is the number of satisfied packets (i.e. the number of packets which are received by the UE and not classified as failed) divided by the total number of packets received at the base station for that UE.

The algorithm in the present embodiment gives an indication of the total quality of service (QoS). Therefore, for each UE the number of QoS satisfied received octets is determined as, $$Oct_{Received\_Satisfied\_QoS_n}(m) = Oct_{Received_n}(m) - Oct_{Received\_Failed\_QoS_n}(m), n=1 \ldots N \quad (2)$$

where n represents the UE index, $Oct_{Received\_Satisfied\_QoS_n}(m)$ is the number of QoS-satisfied octets which are delivered successfully within the delay threshold limit assigned and $Oct_{Received\_Failed\_QoS_n}(m)$ is the number of received QoS-failed octets for nth UE at the mth scheduling event.

For each UE the portion of throughput which is satisfied in terms of the QoS is defined as $$Ratio\_Satisfy\_QoS_n(m) = \frac{Oct_{Received\_Satisfied\_QoS_n}(m)}{Oct_{Arrived\_Node\_B_n}(m)}, n = 1 \ldots N \quad (3)$$

where $Oct_{Arrived\_Node\_B_n}$ is the number of originally delivered octets to the source queue of the nth UE at the base station. When no packet has arrived for the nth UE, or its queue is empty, it is assumed that $Ratio\_Satisfy_{\_QoS_n}(m)=0$ for that UE.

3. Buffer Occupancy

As packets arrive at the base station from a source UE they are buffered on a first-in-first-out basis for transmission to the destination UE. The buffer occupancy for a particular destination UE is the number of packets for that UE which are buffered at the base station.

For each UE the current FIFO buffer length is updated for the current uplink scheduling event as $$FIFO\_Length_n(m) = (Oct_{Arrived\_Nod\_B}(m))_n - (Oct_{Received}(m))_n, n=1 \ldots N \quad (4)$$

The above qualities are updated for each uplink scheduling event. This might be at a rate of every TTI, or for every scheduling event in the downlink, or at some other interval. For example, they may be calculated every two or more TTIs to reduce the delay introduced to the uplink by the reporting process.

Relative Profile

At this stage the base station has determined three quality indicators for each of the destination UEs. These three quality indicators are used to determine a number of relative quality indicators for each destination UE. The relative quality indicators give an indication of where each UE stands in terms of quality of service in relation to other UEs. In the present embodiment the following four relative quality indicators are used.

1. distance from average throughput
2. distance from minimum grouped throughput ratio
3. distance from minimum grouped quality of service
4. distance from minimum grouped buffer length 1. Distance from Average Throughput The base station determines the distance of the throughput ratio of each destination UE from the average throughput. The average throughput is defined as $$\text{Avg\_Th}(m) = \frac{1}{N}\sum_{n=1}^{N} Th_n(m) \qquad (5)$$

The distance of the throughput ratio of the n-th UE itself is computed as $$\text{Distance\_Avg}_n(m) = 1 + Th_n(m) - \text{Avg\_Th}(m) \quad n=1 \ldots N \qquad (6)$$

Assuming that maximum distance average at this stage is defined as $$\text{Distance\_Avg}_{max} = \max(\text{Distance\_Avg}_n(m)), n=1\ldots N \qquad (7)$$

then the distance of the throughput ratio can be normalized as follows $$\text{Norm\_Distance\_Avg}_n(m) = 1 - \text{Distance\_Avg}_n(m)/\text{Distance\_Avg}_{max} \qquad (8)$$

Since the quantities involved in the final credit value might have different numeric ranges, it is desirable to map their original distance value ranges to similar ranges.

This prevents an unbalanced situation in which one distance quantity can be dominant. For example the distance from average throughput may be around 0.1 while the QoS distance for video service might always take a value nearer to 0.01. To create a homogeneous behaviour for the uplink scheduling decisions the following secondary mathematical metric is introduced:

$$\text{Distance\_Avg\_Th}_n(m) = \qquad (9)$$

$$\text{Norm\_Distance\_Avg}_n(m)/\sum_{i=1}^{N}\text{Norm\_Distance\_Avg}_i(m)$$

This metric gives an indication of where the UE stands compared to the average throughput ratio.

2. Distance from Minimum Grouped Throughput Ratio

To determine this metric the UEs are first grouped into different classes based on the delay threshold. For example, video services may have a low delay threshold, while web services may have a relatively high delay threshold, and therefore these services may be classified into different groups.

It is assumed that the j-th group includes $m_j$ UEs. Assuming the n-th UE belongs to the j-th group, the normalised grouped throughput ratio is defined as $$\text{Norm\_}Th_n(m) = Th_n(m)/Th_{max,j}(m), n=1 \ldots N \qquad (10)$$

where $Th_{max,j}(m)$ is the maximum throughput ratio of the jth group so far. The throughput ratio distance is determined form minimum normalised throughput ratio of each group so that $$\text{Norm\_Distance\_min\_}Th_n(m) = \text{Norm\_}Th_n(m) - \text{Norm\_}Th_{min,j}(m), n=1 \ldots N \qquad (11)$$

To increase the homogeneous behaviour of the metric, this distance is also subject to a secondary normalised and mathematical mapping, in a similar way to the average throughput distance, so that $$\text{Distance\_min\_Th}_n(m) = \qquad (12)$$

$$\text{Norm\_Distance\_min\_Th}_n(m)/\sum_{i=1}^{N}\text{Norm\_Distance\_min\_Th}_i(m)$$

This metric gives an indication of how well each UE is doing in terms of throughput ratio compared to the UE that has the worst throughput among all the UEs in current service group.

3. Distance from Minimum Grouped QoS

To determine this metric a normalised quality of service is first calculated, as follows $$\text{Norm\_QoS}_n(m) = \text{Ratio\_Satisfy\_QoS}_n(m)/\text{Ratio\_Satisfy\_QoS}_{max,j}(m) \; n=1 \ldots N \qquad (13)$$

where $\text{Ratio\_Satisfy\_QoS}_{max,j}(m)$ is the maximum QoS of the jth group with the same service delay tolerance. The throughput ratio distance is determined from the minimum normalised QoS ratio of each group so that $$\text{Norm\_Distance\_min\_QoS}_n(m) = \text{Norm\_QoS}_n(m) - \text{Norm\_QoS}_{min,j}(m), n=1 \ldots N \qquad (14)$$

where $\text{Norm\_QoS}_{min,j}(m)$ is the minimum normalised QoS of group j. To increase the homogeneous behaviour of the metric this distance is also subject to a secondary normalised and mathematical mapping, similar to the average throughput distance, so that $$\text{Distance\_min\_QoS}_n(m) = \qquad (15)$$

$$\text{Norm\_Distance\_min\_QoS}_n(m)/\sum_{i=1}^{N}\text{Norm\_Distance\_min\_QoS}_i(m)$$

This metric gives an indication of how well that UE is doing in terms of QoS compared to the UE that has the worst QoS among all the UEs in the current service group.

4. Distance from Minimum Grouped Buffer Length

This metric is used to indicate how much data is currently waiting in the queue assigned to each destination UE, in the base station FIFO, compared to the UE which has the minimum amount of data to transmit and minimum FIFO queue length, within the j-th service group. First the normalised buffer length is determined as follows $$\text{Norm\_FIFO}_n(m) = \text{FIFO\_Length}_n(m)/\text{FIFO\_Length}_{max,j}(m), n=1 \ldots N \qquad (16)$$

where $\text{FIFO\_Length}_{max,j}(m)$ is the maximum buffer FIFO length of the j-th group with the same service delay tolerance. The distance of FIFO buffer length is determined from the minimum normalised FIFO length of each group so that $$\text{Norm\_Distance\_min\_FIFO}_n(m) = \text{Norm\_FIFO}_n(m) - \text{Norm FIFO}_{min,j}(m), n=1 \ldots N \qquad (17)$$

where $\text{Norm\_FIFO}_{min,j}(m)$ is the minimum normalised FIFO length of group j. To increase the homogeneous behaviour of the metric, this distance also becomes subject to a secondary normalised and mathematical mapping, in a similar way to the average throughput distance, so that $$\text{Distance\_min\_FIFO}_n(m) = \qquad (18)$$

$$\text{Norm\_Distance\_min\_FIFO}_n(m)/\sum_{i=1}^{N}\text{Norm\_Distance\_min\_FIFO}_i(m)$$

Single Multidimensional Credit Value

At this stage the base station has determined four independent quantities related to different aspects of downlink scheduling. All of these quantities have some value between zero and one. These four quantities are then combined to give a single credit value.

In the present embodiment the four quantities are combined in the following way.

$$\text{Distance\_min}_n(m) = (1 + \text{Distance\_min\_Th}_n(m)) \cdot \quad (19)$$
$$(1 + \text{Distance\_min\_QoS}_n(m)) \cdot (1 + \text{Distance\_min\_FIFO}_n(m)) \cdot$$
$$(1 + \text{Distance\_Avg\_Th}_n(m)), n = 1 \ldots N$$

If the metrics were simply multiplied, and any one of the metrics had a value of zero, then the impact of the other involved metrics would vanish. The value one is added to each metric to prevent this effect. The numeric value of final metric is therefore higher than one. In order to reduce the complexity of uplink scheduling and amount of communication and to represent this credit metric just with one information byte, this value is transformed to become real number which has a numeric value between zero and one. To transform the numeric values first we define $$\text{New\_Distance\_min}_n(m) = \text{Distance\_min}_n(m) - \min(\text{Distance\_min}_n), n = 1 \ldots N \quad (20)$$

Then the following transform is performed $$\text{New\_Distance\_min1}_n(m) = \text{Distance\_min}_n(m)/\max(\text{Distance\_min}_n), n = 1 \ldots N \quad (21)$$

and finally $$\text{Distance\_from\_min}_n(m) = \text{Distance\_min1}_n(m) - \min(\text{Distance\_min1}_n), n = 1 \ldots N \quad (22)$$

This is the credit value which has a numeric value between 0 and 1. By multiplying this real number by 100 and picking the integer part, a final credit value with a numeric value between 0 and 100 is obtained for each UE.

Each credit value is then transmitted to the corresponding source UE. The credit value may be transmitted, for example, in the control channel, or as a special byte in a data channel, or by any other means. Each source UE is provided with a predetermined algorithm which determines the uplink scheduling for that UE. The predetermined algorithm uses the received credit value to determine the rate and/or times at which the UE should transmit. In general, UEs which have a low credit value are given greater priority than UEs with higher credit values. In this way the various UEs co-operate to ensure greater fairness in the allocation of resources. Other factors, such as power control information and channel quality information, may also be taken into account when determining the rate and/or times of transmission. Further details of the scheduling algorithms will be given later.

The above process is repeated at appropriate intervals. For example, the credit value may be calculated for every Time Transmission Interval (TTI), or for every scheduling event in the downlink, or at some other interval. For example, it may be calculated every two or more TTIs to reduce the delay introduced to the uplink by the reporting process.

It will be appreciated that not all of the indicators described above need necessarily be used, and that other indicators of the quality of service in the downlink channels could be used as well as or instead of the indicators described above.

Base Station

Figure 2:
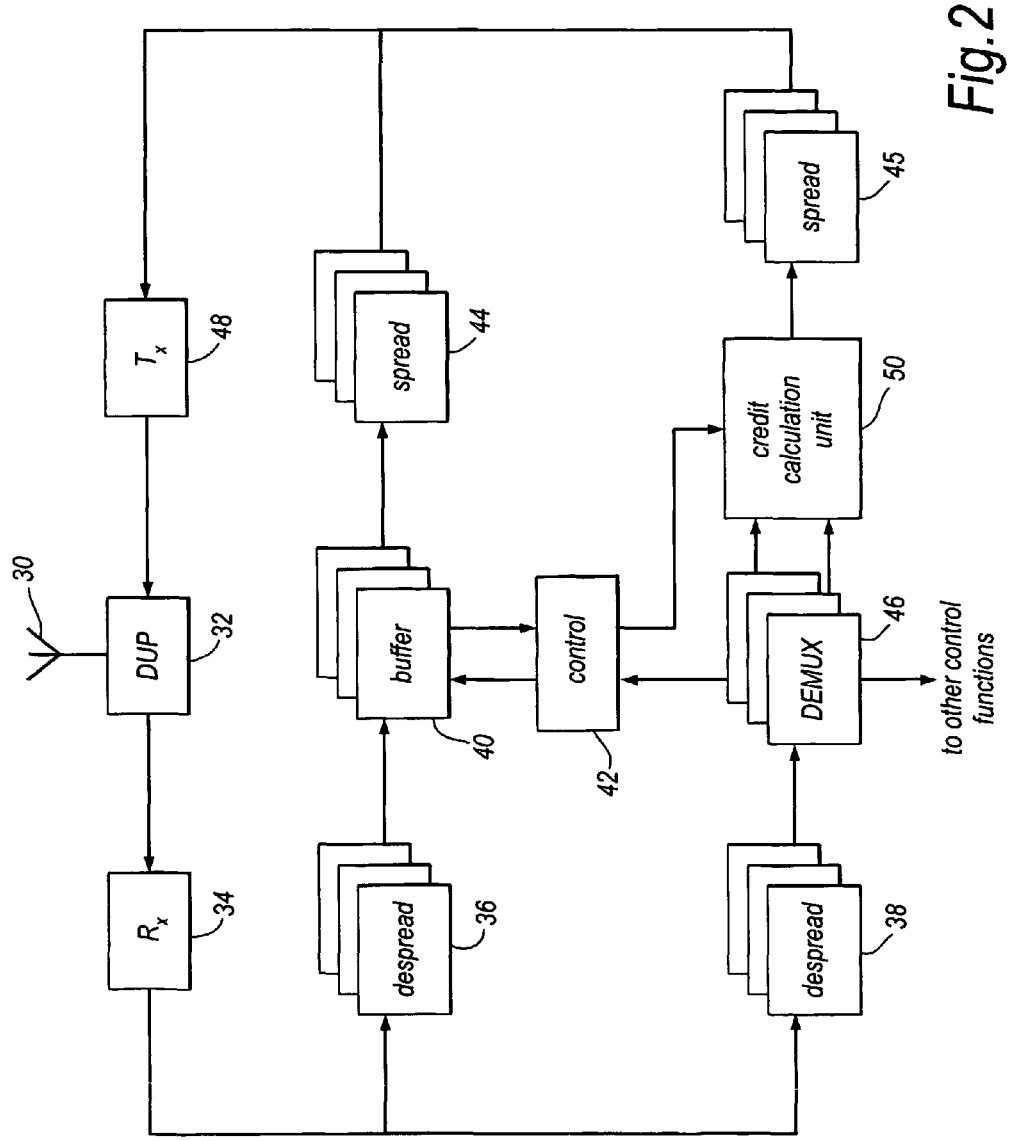
FIG. 2 shows parts of a base station in an embodiment of the present invention.

FIG. 2 shows parts of a base station in the first embodiment. In operation, base station 10 receives signals from antenna 30 and passes these signals to duplexer 32.

The duplexer separates received signals from signals to be transmitted, and passes the received signals to receiver 34. The receiver 34 down-converts and digitises the received signals. The received signals are then separated according to their channelisation codes by despreaders 36 and 38. In FIG. 2, despreaders 36 use the channelisation codes employed in the uplink channels from the source UEs to the base station in order to separate the data packets transmitted by each of the source UEs. The despreaders 38 use the channelisation codes employed in transmitting a control channel from the destination UEs to the base station, in order to separate out those control channels.

The data packets received from the source UEs are stored in buffers 40. The data packets are output from the buffers 40 under control of control unit 42, which performs a scheduling routine in order to schedule the data packets for transmission in the downlink. The data packets output from the buffers 40 are passed to spreaders 44, which code signals for each of the destination UEs with an individual channelisation code. The thus coded signals are then passed via transmitter 48 and duplexer 32 to the antenna 30 for transmission to the destination UEs.

The control unit 42 also receives information from the buffers concerning the rate of arrival of data packets. This information is output by the control unit 42 to credit calculation unit 50 for use in the credit calculation, as will be explained.

The control channels from the destination UEs which are output by despreaders 38 are passed to demultiplexers 46. The demultiplexers 46 separate out various types of information contained in the control channels, including information concerning the number of packets received by the destination UEs and the number of failed packets at the destination UEs. This information is also passed to credit calculation unit 50 for use in the credit calculation.

The credit calculation unit 50 calculates a credit value for each of the source UEs. These credit values are output from the credit calculation unit 50 and passed to spreaders 45 for transmission to the respective source UEs. In this embodiment the credit values are transmitted in control channels to the source UEs, although other channels such as data channels could also be used. Similarly the information obtained from the destination UEs may be received in channels other than the control channels.

Figure 3:
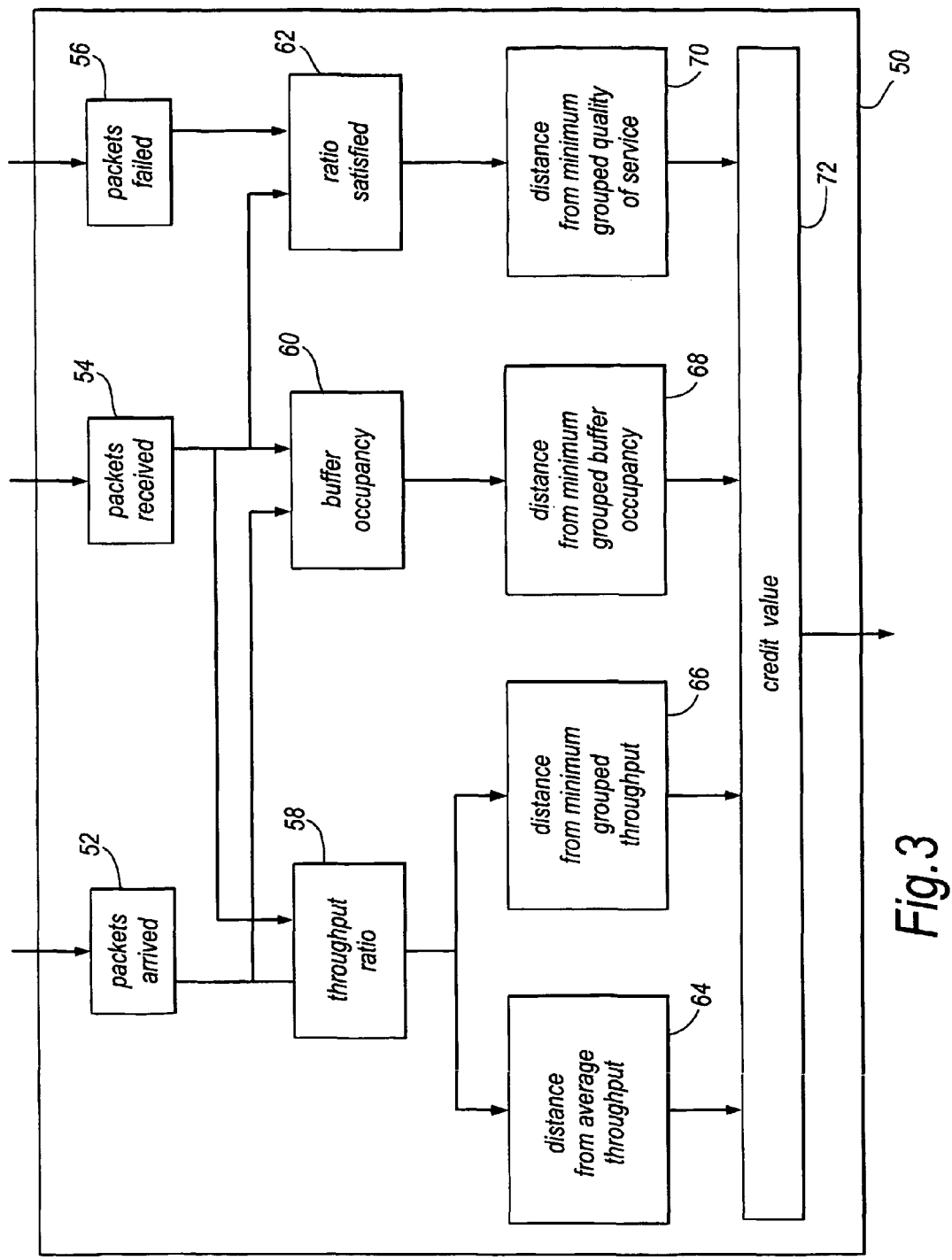
FIG. 3 shows parts of a credit value calculation unit in an embodiment of the present invention.

FIG. 3 shows in more detail parts of the credit calculation unit 50. Referring to FIG. 3, packets arrived indicator 52 indicates the number of packets which have arrived at the base station for each source UE based on the signal received from the control unit 42. Packets received indicator 54 indicates the number of packets received at each of the destination UEs, based on information received in the control channels from the destination UEs. Packets failed indicator 56 indicates the number of failed packets at each of the destination UEs, again based on information received in the control channels from the destination UEs.

Throughput ratio calculation unit 58 calculates the throughput ratios for the various UEs in accordance with equation (1) above, using the outputs of packets arrived indicator 52 and packets received indicator 54. Buffer occupancy calculation unit 60 calculates the base station buffer occupancy in accordance with equation (4) above, also using the outputs of packets arrived indicator 52 and packets received indicator 54. Ratio satisfied calculation unit 62 calculates the ratio of satisfied packets in accordance with equations (2) and (3) above, using the outputs of packets arrived indicator 52, packets received indicator 54, and packets failed indicator 56.

Distance from average throughput calculation unit 64 calculates the distance from average throughput in accordance with equations (5) to (8) above, using the outputs of throughput ratio calculation unit 58. Distance from minimum grouped throughput ratio calculation unit 66 calculates the distance from minimum throughput ratio in accordance with equations (10) to (12) above, also using the outputs of throughput ratio calculation unit 58. Distance from minimum grouped buffer occupancy calculation unit 68 calculates the distance from the minimum grouped buffer occupancy in accordance with equations (16) to (18) above, using the outputs from the buffer occupancy calculation unit 60. Distance from minimum grouped quality of service calculation unit 70 calculates the distance from the minimum grouped quality of service in accordance with equations (13) to (15) above, using the outputs from the ratio satisfied calculation unit 62.

The outputs of the distance from minimum grouped throughput ratio calculation unit 66, distance from minimum grouped throughput ratio calculation unit 66, distance from minimum grouped buffer occupancy calculation unit 68, and distance from minimum grouped quality of service calculation unit 70 are fed to final credit value calculation unit 72, which calculates the final credit values for each of the UEs in accordance with equations (19) to (22) above. The final credit values are output from the credit calculation unit 50 for transmission to the respective source UEs.

Scheduling Algorithms

As explained above, each source UE receives a credit value from the base station. The credit value gives an indication of how well that UE is doing in comparison to other UEs in terms of quality of service through to the destination UE. The UE combines the credit value with its own existing knowledge about the radio channel conditions to give a final decision metric, which is used to make decisions on packet transmissions. In this way the various source UEs co-operate to improve the overall quality of service.

In the present embodiment two different uplink scheduling mechanisms are used, depending on the overall status of the communications system. The first mechanism is a hybrid rate-time scheduling mechanism. In this mechanism, unlike pure time scheduling, one UE does not occupy all of the uplink resources at any one time. On the other hand, unlike pure rate scheduling, not all of the UEs are transmitting all of the time. Instead, each UE experiences two kinds of period, an active period and a silent period. This hybrid rate-time mechanism is referred to herein as Multidimensional Rate-Time Hybrid QoS-based Packet Scheduler (MRT-HQPS).

In the hybrid rate-time scheduler, each UE has an active mode within which it is allowed by the uplink scheduling functionality to transmit. The UE can also adjust the rate at which it transmits when in the active mode. This transmission period may be, for example, one TTI, or one downlink scheduling event. Each UE also has a silent mode in which it does not transmit. The UE may experience alternate active periods and silent periods. In this way the UE effectively combines rate scheduling and time scheduling. This mechanism can be viewed as a spring with the source UE in control of its elasticity. This mechanism is referred to herein as Elastic Buffering Mechanism.

In some circumstances the delay which results from time scheduling in the hybrid rate-time scheduler can not be tolerated by the power control mechanism. Therefore the second scheduling mechanism which may be used is a rate scheduling mechanism which avoids the silent transmission periods which are experienced in the hybrid rate-time scheduler. In the second scheduling mechanism the silent time is zero, and therefore all of the source UEs transmit at the same time, in a similar way to WCDMA rate scheduling. However, the Modulation and Coding Scheme (MCS) level (i.e. the transmission rate) is decided by the UE based on the credit value in combination with information on the radio channel conditions. This may be done, for example, by consulting a look-up table which includes the appropriate MCS levels. When the UE receives a good credit value from the base station, it assumes that it is doing well and that there are other UEs with poorer credit values. The UE with the good credit values can therefore reduce its MCS level for a while (for example, for a few TTIs) to allow the poorer UEs to recover. Similarly, when a UE receives a poor credit value, it may increase its MCS level, particularly if the radio conditions are good. If radio conditions are not good then the poorer UE may have to accept a lower quality of service. If the radio channel conditions are superb, the UE might not go for very low MCS values, even if its credit value is high.

In both the hybrid rate-time scheduler and the rate scheduler, the UE combines the knowledge about the downlink sent by the base station with its own existing knowledge about the radio channel conditions, and makes a decision on the format of its packet transmission. In both cases, a final decision metric is determined, as follows $$\text{Final\_Decision\_Metric}_k(m) = \text{COM}(\text{Distance\_from\_min}_k(m), Ch_k(m)) \quad (23)$$

where $Ch_k(m)$ is the knowledge about quality of channel in uplink between the kth source UE and corresponding base station, $\text{Distance\_from\_min}_k(m)$ is the credit value sent to the UE from the base station, and $\text{COM}(\cdot)$ is a function that combines these two values. As an example, the function COM may multiply the two values, with weighting where appropriate. In another example, the function COM is a look-up table containing predetermined values.

In the hybrid rate-time scheduler, in order to decide when to transmit, each UE makes use of an assigned maximum acceptable waiting time or sleeping time. This is a value which is assigned to the UE depending on the type of service, and gives the maximum time which it is acceptable for a data packet to wait at the UE before being transmitted. Each UE then determines an actual waiting time for its data packets based on the maximum waiting time and the final decision metric, as follows $$\text{Waiting\_Time}_k(m) = \text{floor}(\text{Final\_Decision\_Metric}_k(m) \cdot \text{max\_Waiting\_Time}_j) \quad (24)$$

where $\text{max\_Waiting\_Time}_j$ is the maximum waiting time assigned to source UE k and service group j and floor (.) is a mathematical operator which determines the lower integer part of any given real numeric value.

By adjusting the actual waiting time of the data packets, the UE in effect adjusts its data transmission rate.

Assuming that $\text{Waiting\_Time}_k(m)$ can be represented as U TTIs, to decide if the source UE can transmit in current TTI or uplink scheduling event the following condition should be satisfied:

$$\begin{cases} (m \% U) > 0 & \text{Wait} \\ (m \% U) = 0 & \text{Transmit} \end{cases} \quad (25)$$

where the mathematical operator %, determines the residue when the current timing m is divided by the integer presentation of waiting time.

To decide about the MCS level in both the hybrid rate-time scheduling and the rate scheduling cases, a lookup table of available MCS level is assigned to the source UE. By looking at Final_Decision_Metric$_k$, the source UE is capable of selecting the most appropriate MCS level.

Deciding about the maximum amount of waiting period or delay elasticity may prove difficult for different services and different propagation environments in a practical situation. Thus, in one variant of the present embodiment, two upper and lower bounds for this maximum delay elasticity or waiting time are assigned for each UE. Each UE is also provided with a credit history buffering so that $$\text{Credit\_History}_k(m) = \{\text{Final\_Decision\_Metric}_k(m-1)\},$$
$$l=0 \ldots L-1 \quad (26)$$

where m represents the current TTI or uplink scheduling event and L is the length of credit history buffer Credit_History$_k$(m). The UE saves the last received credit values from the base station in this buffer. At each uplink scheduling instant, the UE determines the trend of its credit history so that $$\text{Trend\_UE}_k(m) = \sum_{i=1}^{L-1} (\text{Credit\_History}_k(i+1) - \text{Credit\_History}_k(i)) \quad (27)$$

The trend is employed to update the maximum waiting time so that if the received credit values become worse and worse (i.e. negative values occur in equation (26)), the source UE is allowed to reduce its maximum delay elasticity or waiting time. The reduced value can not go below the assigned lower bound. If the credit history is constantly improving and the source UE enjoys a good quality of service provisioning and good access to its destination UE already, the source UE should increase its maximum delay elasticity on a temporary basis. This means that, since the source UE of interest is already doing well in terms of packet delivery from uplink to the destination UE at downlink, it can temporarily accept to slow down and give a chance to source UEs with poor profiles. This increased value can not exceed the assigned upper limit.

In a mixed service environment where services of different nature share the same channel, the proposed metrics and mechanisms introduce so far are defined in a way to give the source UEs at uplink the capability effectively to slow down other UEs within the same class of service or groups of services with lower delay tolerance. Therefore UEs that, for example, provide real-time video service can slow down UEs with background services or WWW downloads. However UEs, for example, with WWW downloads can not slow down UEs with real-time continuous video conversational services. By having this capability supported by the scheduling functions, the overall uplink-downlink scheduling process can be improved.

User Equipment

Figure 4:
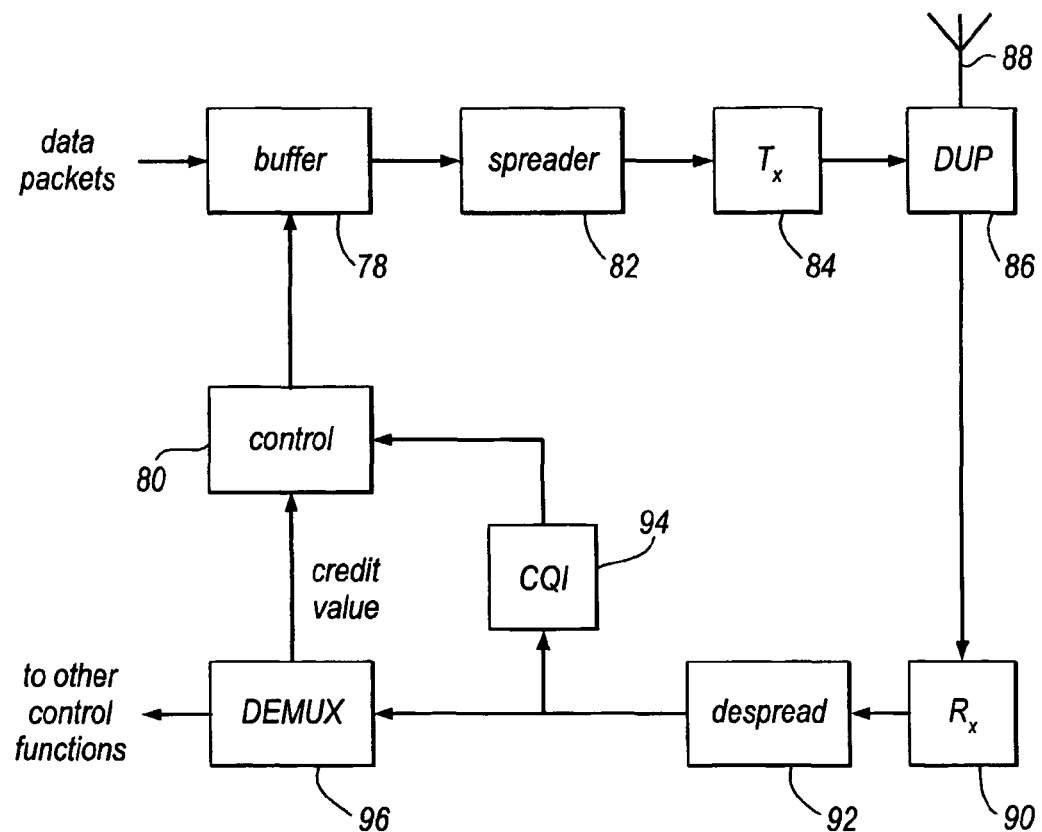
FIG. 4 shows parts of a user equipment in an embodiment of the present invention.

FIG. 4 shows parts of a UE in the present embodiment. Referring to FIG. 4, a buffer 78 receives data packets and stores them for transmission. Data packets are fed out from the buffer 78 under control of control unit 80. Data packets which have been fed out from the buffer are given a channelisation code by spreader 82 and are transmitted to the base station by means of transmitter 84, duplexer 86 and antenna 88.

A control channel is received from the base station by means of antenna 88, duplexer 86 and receiver 90, and is separated from other signals by means of despreader 92. A channel quality indicator 94 estimates the quality of the channel between the UE and the base station, and passes this value to the control unit 80. Any suitable measure of quality can be produced; for example, a received signal strength (RSS) or power measure, a bit error rate (BER) or a frame error rate (FER) measure, or a signal-to-interference ratio (SIR) or a signal-to-interference-and-noise ratio (SINR) measure could be produced. The measure could be based on a pilot signal broadcast by the base station. For example, the strength of the pilot signal could be taken as a measure of signal quality, or the base station may also broadcast the transmit power ratio of a data channel to the pilot channel, and this ratio could be used in conjunction with the pilot signal strength to obtain a measure of signal quality. Alternatively the measure could be derived from transmission power control (TCP) information (such as a power up/power down instruction) generated in the user equipment for downlink power control purposes. Any of the measures could be based on a history or average of measurements taken over several measurement periods. Two or more measures could be combined, if desired.

Demultiplexer 96 demultiplexes from the control channel the credit value which has been sent by the base station to the UE. This credit value is also passed to the control unit 80. In addition, other information such as power control bits may be passed to the control unit 80. The control unit performs a scheduling routine in order to decide when and at what rate the data packets are fed out from the buffer 78. This routine may be any of the routines described above.

Examples

Figure 5:
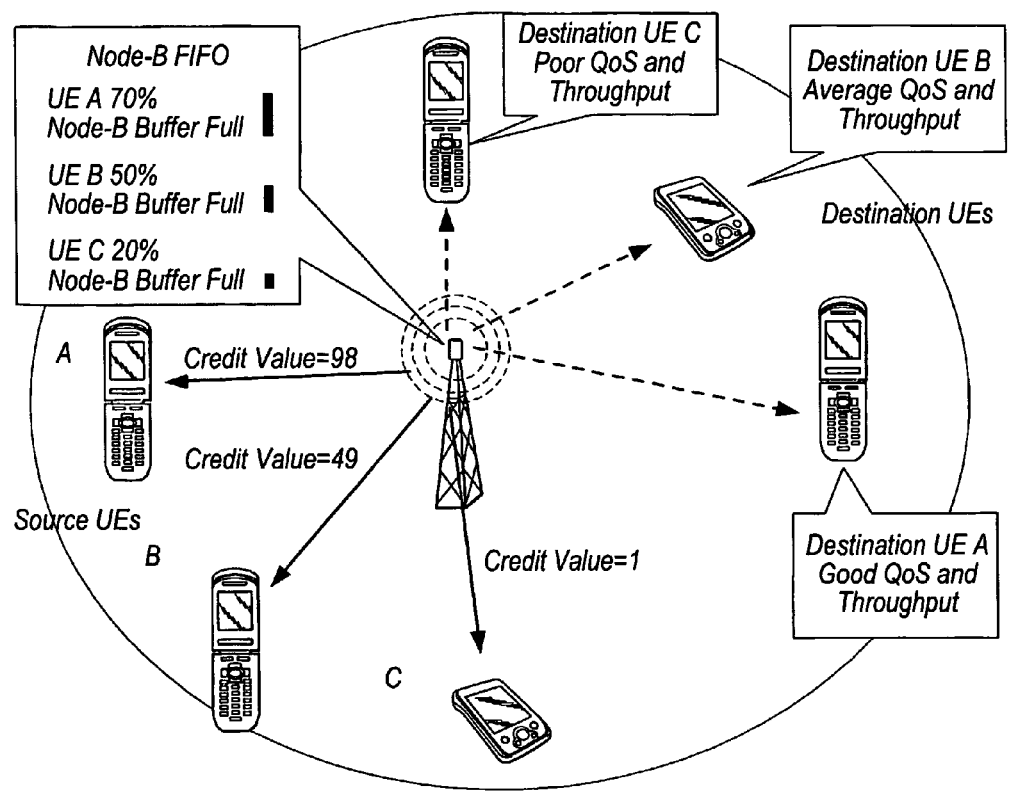
FIG. 5 shows an example of the operation of an embodiment of the present invention.

To explain some of the advantages of the proposed algorithm, an example is presented in FIG. 5, where the source UEs A, B and C try to send data to the corresponding destination UEs A, B and C through Node-B (the base station). All of the UEs are assumed to have real-time streaming conversational video services.

Figure 6:
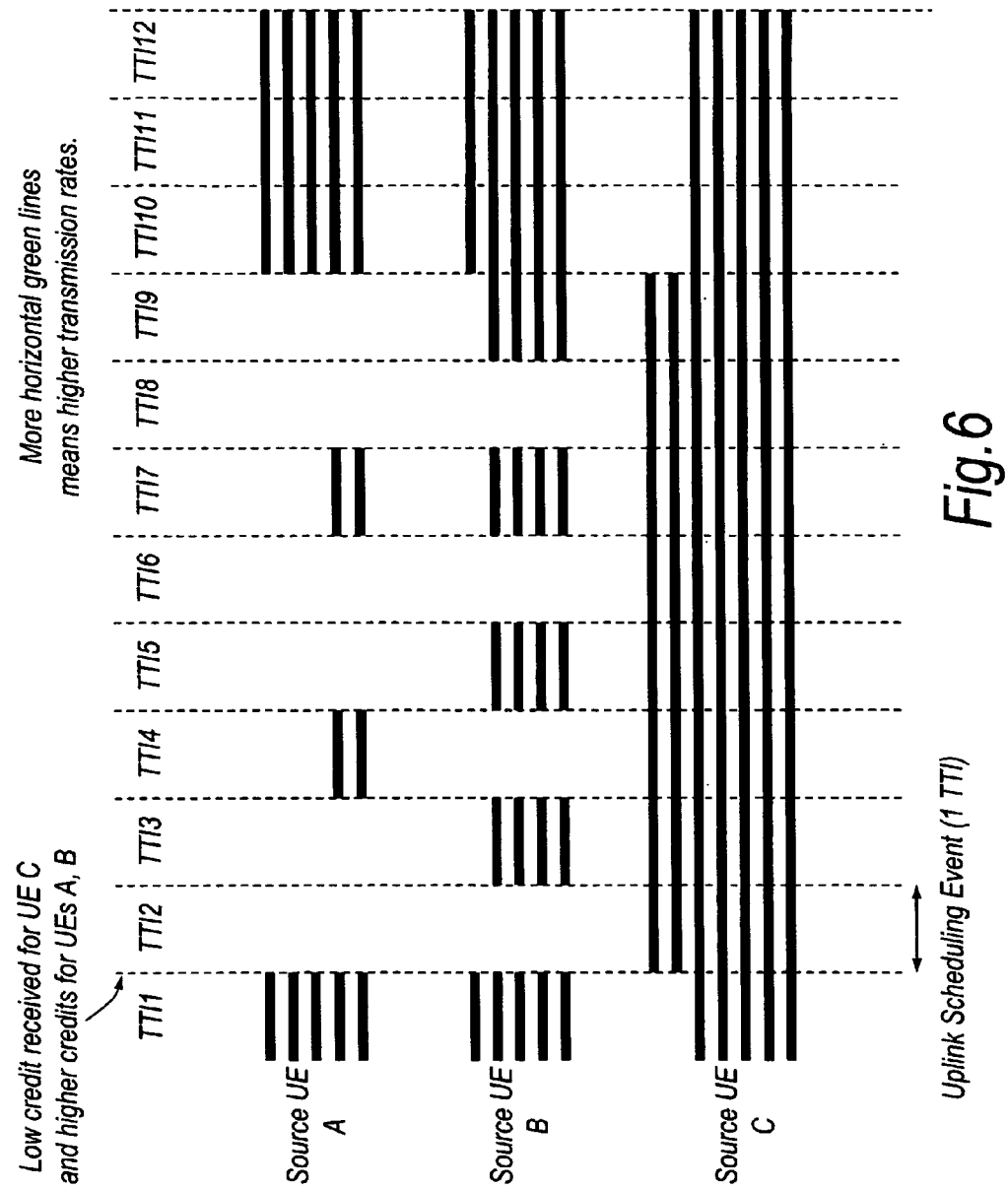
FIG. 6 shows an example of hybrid rate-time scheduling in an embodiment of the invention.

In this example, it can be seen that UE A not only has lots of data to transmit (70% of its assigned Node-B FIFO buffer is full), but it also enjoys a good QoS and throughput so far. UE B at the same time has 50% of its assigned FIFO buffer full and has achieved an average QoS and average throughput profiles, and finally UE C's buffer has only 20% of its buffer full and has given a poor QoS and poor throughput. As an example, the present algorithm will give the highest credit value of 98 to UE A, since it has the highest distance from the UE C with poorest and minimum profile and highest distance form the achieved average throughput (i.e. metric Distance_Avg$_{Th_n}$(m)). UE B is given an average credit value of 49 and UE C has the lowest credit value of 1. If UE A and B carry on with their current transmission rates, UE C will always face a fierce competition from these source UEs in the uplink (i.e. high interference levels) and will never be able to recover from its current poor profile. For example it will never have a Node-B FIFO buffer length similar to other two UEs which is vital to fairness of packet scheduling process for the entire uplink-downlink, especially when dealing with continuous real-time services with equal data pipes. Therefore, after having received one byte of credit information, the source UE's with higher received credit values slow down more than the UEs with lower credit values on a temporarily basis. This is shown in FIG. 6 for hybrid rate-time scheduling and FIG. 7 for rate scheduling. In these Figures, the horizontal lines represents the rate of transmission and the MCS level. Therefore the greater the number of horizontal lines the higher the transmission rate (i.e. higher MCS level).

Referring to FIG. 6, it can be seen that, at the beginning of the second uplink scheduling event (TTI 2), UEs A, B and C have received credit values according to FIG. 5. Therefore, since hybrid rate-time scheduling is supported in FIG. 6, UEs A and B experience silent periods, and also switch to lower transmission rates. At the same time UE C switches to a higher transmission rate and performs continuous transmission. All source UEs switch to continuous transmission with a similar rate of transmission after UE C recovery and when FIFO load balancing has been achieved. In FIG. 6 this occurs at the $10^{th}$ TTI.

Figure 7:
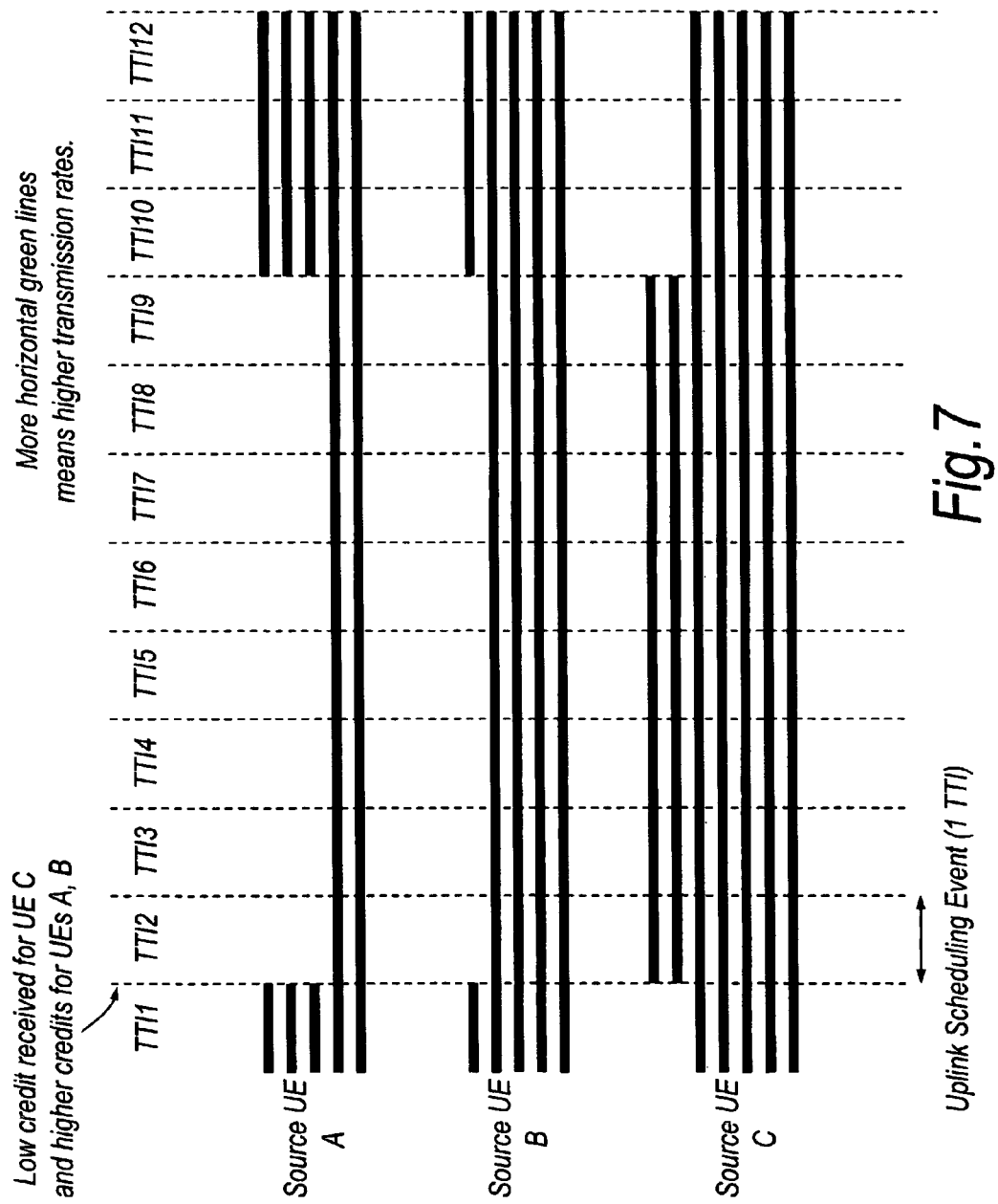
FIG. 7 shows an example of rate scheduling in an embodiment of the invention.

In FIG. 7 only rate scheduling is supported, and therefore no silent periods are experienced by source UEs A and B. Instead these source UEs reduce their transmission rates temporarily. Again the source UEs switch to continuous transmission with a similar rate of transmission when UE C has recovered and FIFO load balancing have been achieved at the $10^{th}$ TTI.

Figure 8:
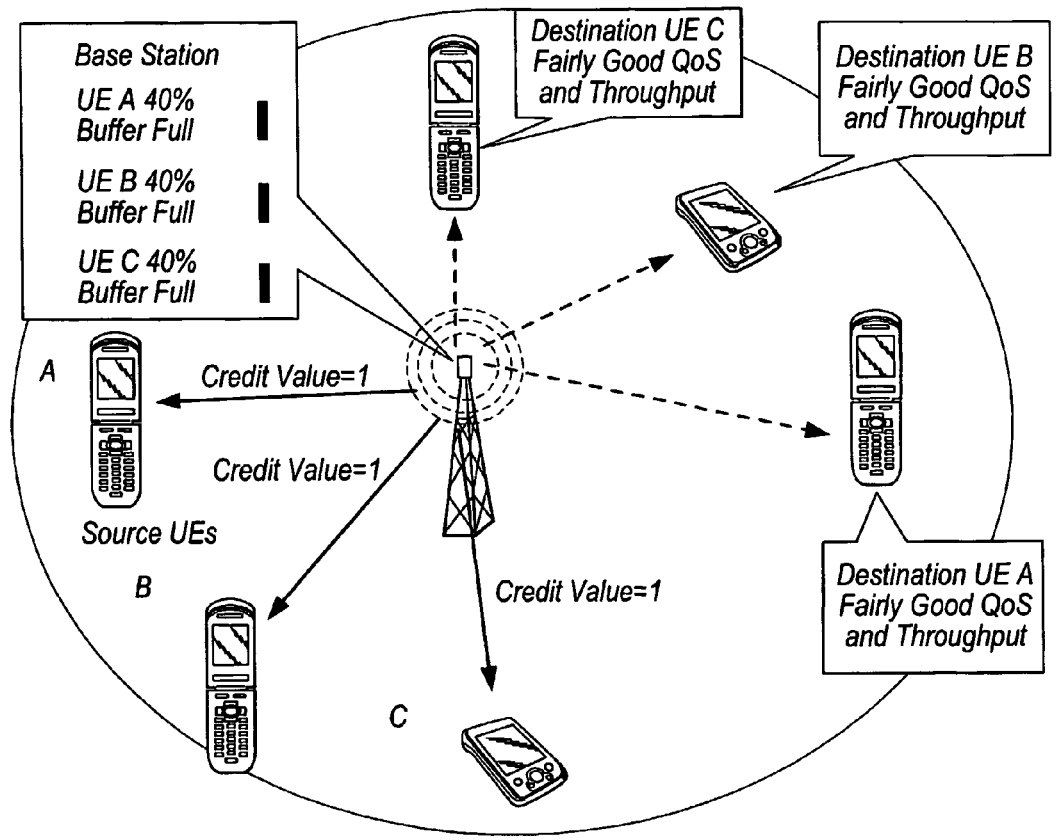
FIG. 8 shows how the situation shown in FIG. 5 may be improved by in embodiment of the invention.

The mechanisms shown in FIGS. 6 and 7 will ideally transform the situation shown in FIG. 5 to that shown in FIG. 8. In FIG. 8 it can be seen that, since load balancing has been achieved among the FIFO buffers and the UEs have all achieved similarly good QoS features, all the UEs have received low credit values and switch to similar MCS levels.

Simulation Results

The performance of the current hybrid rate-time uplink scheduler was compared to Aloha-like uplink scheduling. In this example only time scheduling was considered, and therefore at uplink UEs do not change their rates and assigned MCS levels. It is assumed that mixed services of real-time continuous video and WWW downloads are being offered. The uplink-downlink performance has been evaluated. A summary of traffic and simulation parameters for the developed test-bed is shown in Table 1 and Table 2. In the downlink it is assumed that a Node-B employing a HSDPA scheme using packet scheduling techniques such as PF (proportional fair) or MPQS is serving a number of UEs.

TABLE 1

Traffic parameters (downlink)

| | | |
|---|---|---|
| WWW Browsing | Packet call size | Pareto distribution with cutoff $\alpha = 1.1$, k = 4.5 kbytes, m = 2 Mbytes (average 25 kbytes) |
| | Reading Time | Geometric Distribution (Average 5 sec) |
| | IP packet size | 1500 bytes |
| | IP Packets per packet call | Packet Call size/IP packet size |
| | Packet inter-arrival time | Geometric distribution (Average 6 msec) |
| Video Streaming Model | | 7.5 frames/sec 32 kbps 3 GPP H.263 Video Encoded Video (see [25], [26]) |

TABLE 2

Simulation parameters (downlink)

| | | |
|---|---|---|
| | Inter Cell Site Distance | 6 km |
| | Number of sectors per cell | 3 |
| | Sector Antenna Radiation Pattern | Ref: ETSI UMTS TR 101.112 |
| HS-DSCH | Transmission time interval | 2 mS |
| | Spreading Factor | 16 |
| | Number of Multicodes | 10 |

TABLE 2-continued

Simulation parameters (downlink)

| | | |
|---|---|---|
| CPICH | Spreading factor | 256 |
| | Hybrid ARQ scheme | Chase Combining |
| | ACK/NACK detection error rate (at Node-B) | Error free |
| | ACK/NACK feedback delay | 3 TTI |
| | Path Loss factor | 3.76 |
| | MCS (Modulation and coding ratio) | QPSK (r = ½, ¾) 16QAM (r = ½, ¾) 64QAM (r = ¾) |
| | Coding | Turbo code |
| | Decoder | Itterative |
| | MCS update interval | 1 TTI |
| | CQI averaging period | 1 TTI |
| | CQI reporting delay | 3 TTI |
| | CQI detection error rate (at Node-B) | Error Free |
| Slow fading (shadowing) | Standard Deviation | 8 dB |
| | Correlation Between Sectors | 1.0 |
| | Between Cell Sites | 0.5 |
| | Decorrelation Distance | 50 m |
| | Multi-path Channel Model | 6 path Vehicular A |
| | Doppler frequency | 6.7 Hz |
| | UE average moving speed | 3.6 km/hr |
| | Carrier Frequency | 2 GHz |
| | Rx Antenna Branches at UE | 1 |
| | Tx Diversity at Node-B | 1 |
| | Mobility Model | ETSI TR 101.112 |
| | User distribution in cell area | Uniform random |

Figure 9:
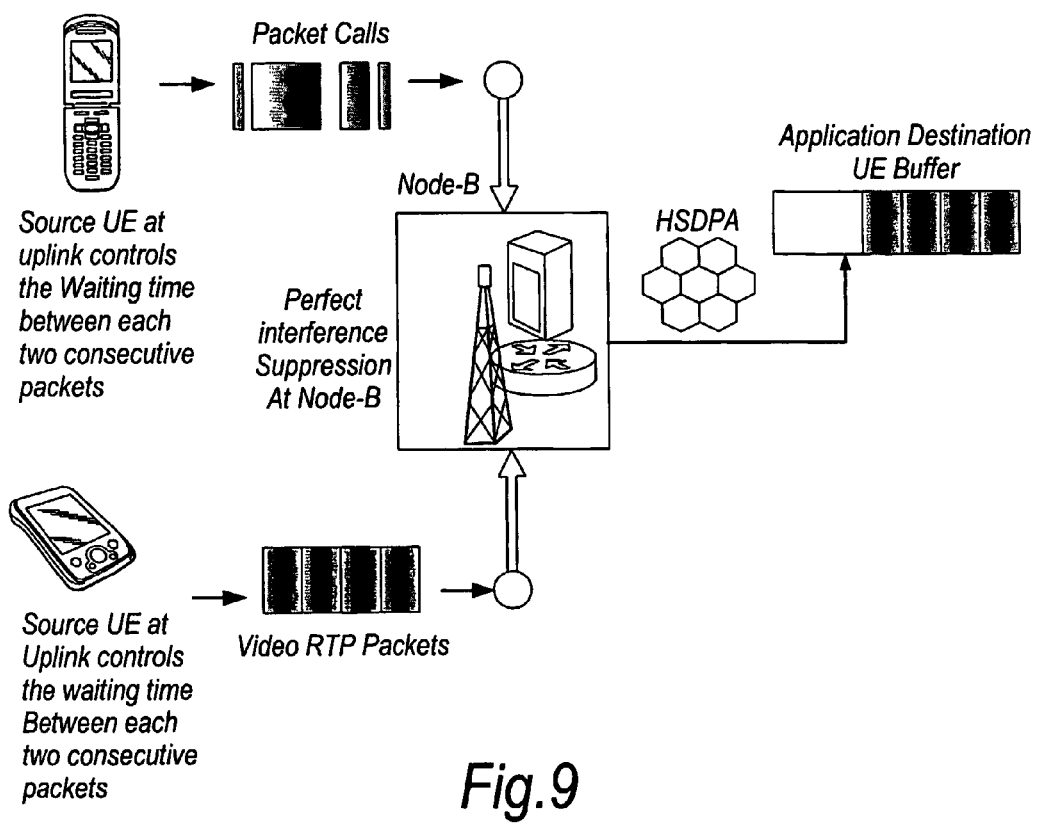
FIG. 9 shows an example of a system model used in experiments.

It is assumed that a source UE in the uplink can experience silent periods. For a WWW session it is assumed that lower bound of delay elasticity is 3 TTIs and higher bound of elasticity is 15 TTIs. For video services these values are 3 and 4 TTIs respectively. The system model is depicted in FIG. 9. A video traffic model based on H.263 video coding is applied. The model concentrates on the traffic characteristics related to video encoding and RTP (Real Time Protocol) packet transport. A modified ETSI WWW browsing model is employed.

For the uplink, perfect interference cancellation is assumed, so that the input packet data sequences sent by the source UEs can be separated without introducing any packet dropping. Adjacent cell at downlink interference is the result of transmissions from the adjacent Node-Bs. The inter-site distance is assumed to be 2.8 km. Path loss is considered to be present and to affect the signal quality. In the downlink, to model the impact of Rayleigh fading, ETSI 6-path Rayleigh Vehicular A channel is employed. It is assumed that the UEs' speed is 3.6 km/h. The shadowing is assumed to have a log-normal distribution. The decorrelation distance is 50 m. The difference between the arrival time and successful delivery to the UE is considered as delivery delay. Minimum reporting delay is considered to be 3 TTIs (i.e.: 3×2 ms). The average user throughput is defined as the average of delivered bit rates over the successive packet calls. For video sessions we treat whole duration of a session as one packet call. In an alternative definition of throughput, the individual throughput ratio is defined as the ratio of successfully delivered data over the arrived data in Node-B for each TTI. The simulation period is 60 sec or 30000 TTIs. The MCS used in this example are QPSK with R=½ and ¾, 16QAM with R=½ and ¾, and 64QAM with R=¾. A packet is dropped, if it can not be delivered within six retransmissions. No limitation from higher layers is applied on the delivery delay. Therefore the exact value of delivery delay is monitored for each transmitted data unit. For video sessions the delay tolerance threshold is assumed to be 100 ms and for WWW sessions this is assumed to be 1.5 Sec. It is assumed that the video frame rate is 7.5 frames/sec and the target bit rate of the output video stream is 32 kbps. It is assumed that the MQPS scheduler mentioned above is employed as the downlink scheduler.

Figure 10:
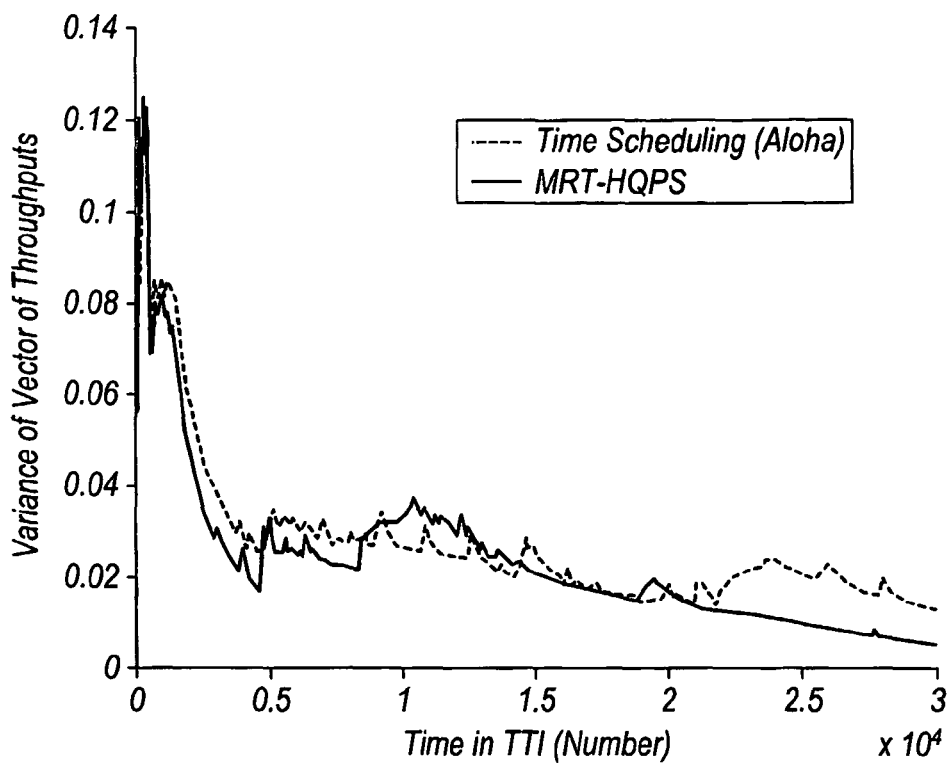
FIGS. 10 to 14 show the results of a comparison between an embodiment of the present invention and a prior technique.

First an Aloha-like time scheduling is adopted for the uplink scheduler, in which source UEs transmit whenever they have packet data available for transmission. Then the hybrid rate-time scheduler described above (MRT-HQPS) is applied to the uplink, although the UEs do not change the MCS level and transmission rate. In FIG. 10 it can be seen that almost all over the transmission time the fairness delivered by this method is higher.

Figure 11:
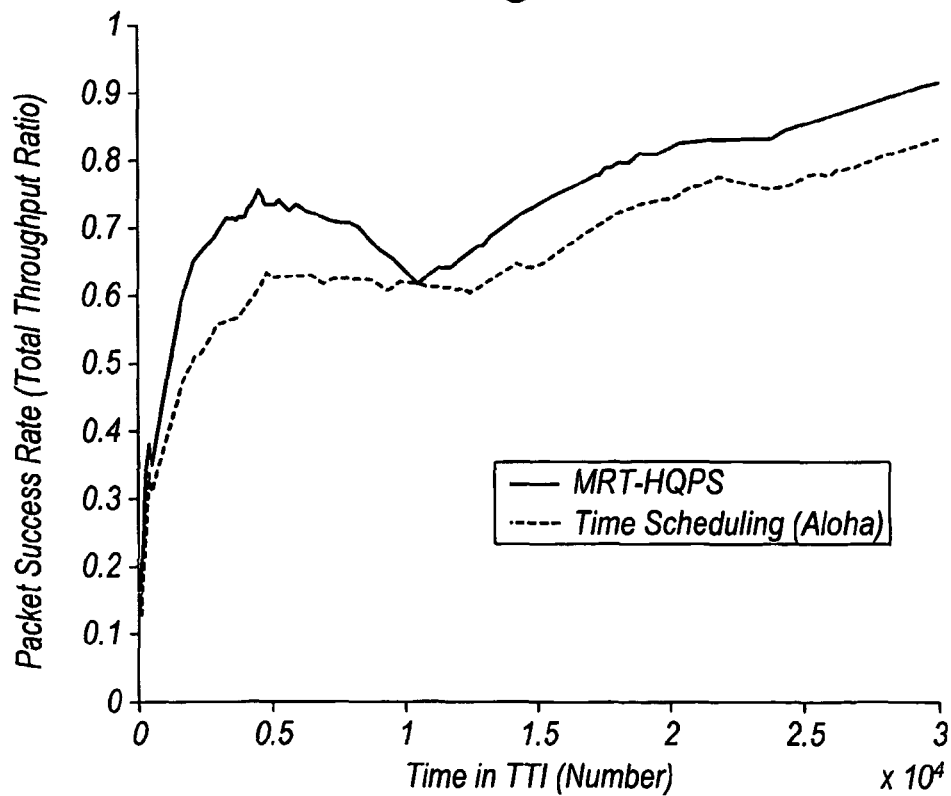

The throughput ratio, or ratio of success of packet delivery, is compared in FIG. 11. It can be seen that MRT-HQPS has outperformed the time scheduling.

Figure 12:
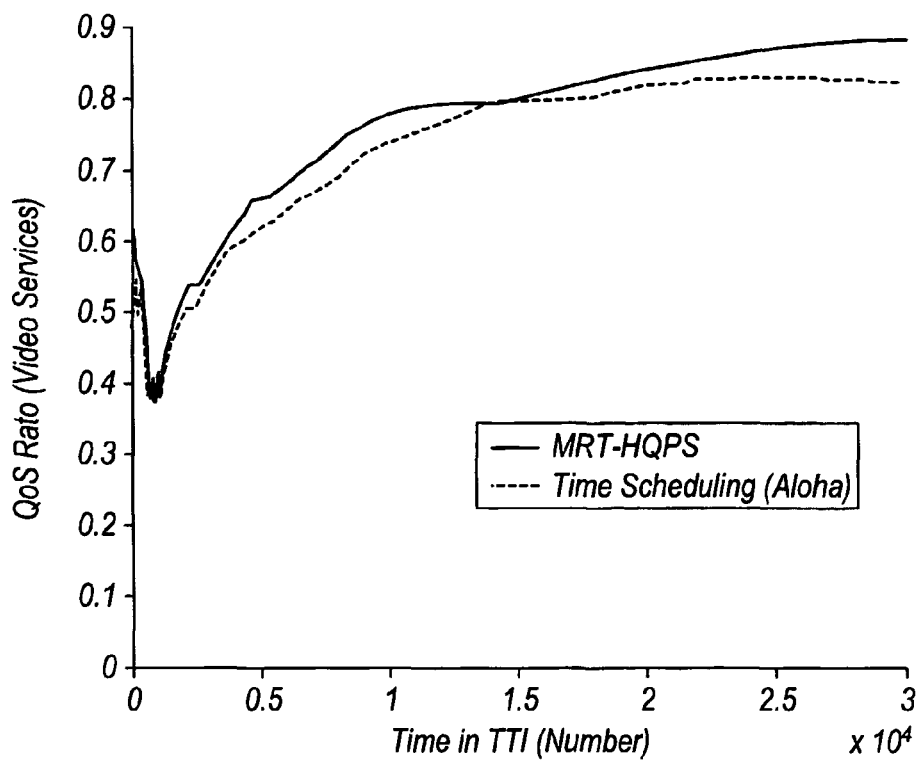
Figure 13:
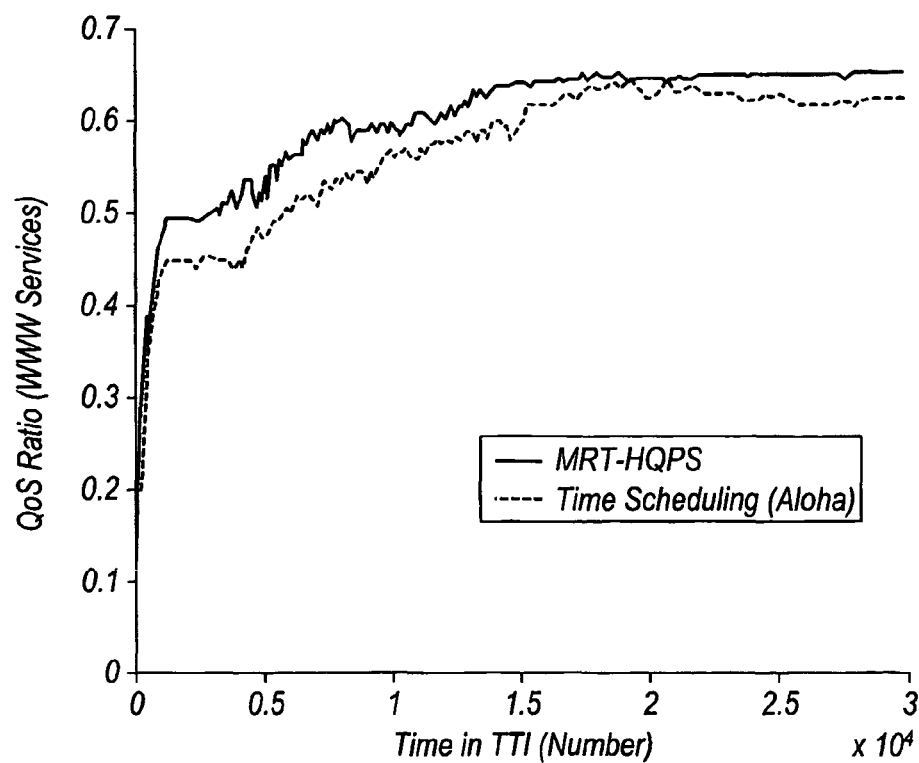

Real time delivered QoS for both video and WWW services is compared in FIG. 12 and FIG. 13 where MRT-HQPS has managed to provide a better QoS.

Figure 14:
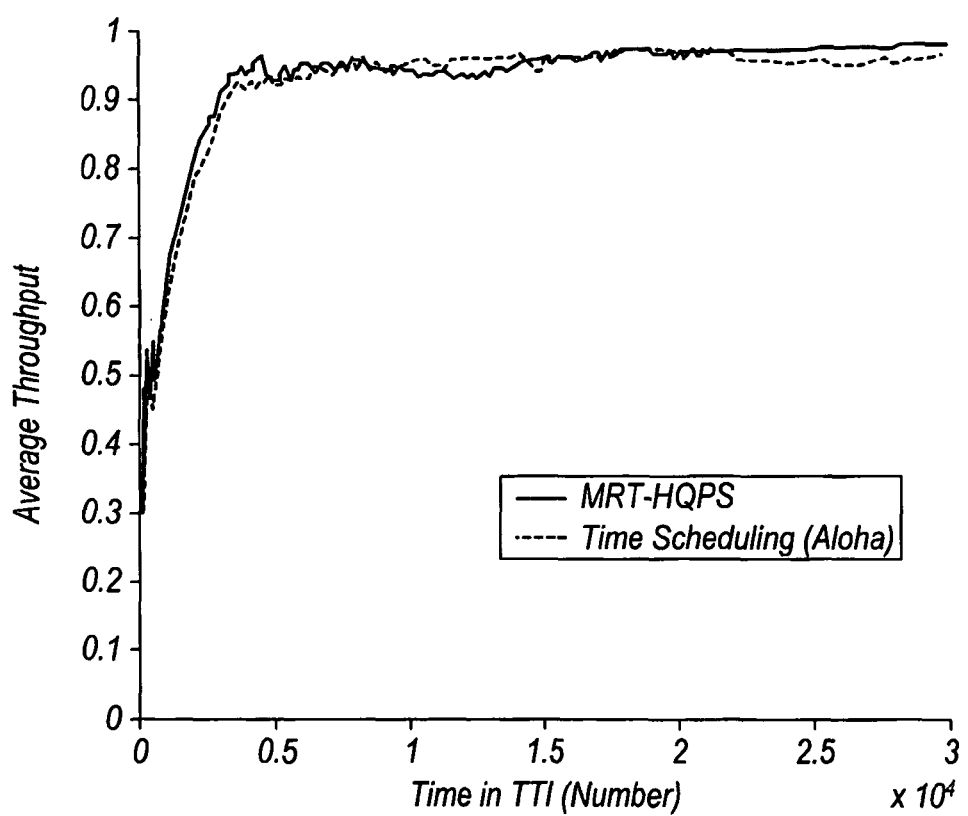

Finally the real-time delivered average throughput ratio is being compared in FIG. 14.

Table 1 compared final achievement performance figures. Evaluated QoS belongs to downlink and delay introduced in uplink is not included in QoS calculation. The reason is that the introduced delay is only a fraction of maximum elasticity delay (fraction of 4 ms for video and fraction of 30 ms for WWW) which is negligible comparing the delay thresholds (100 ms for video and 1500 ms for WWW).

Furthermore, looking at Table 1, it can be seen that although this delay or silent time has been introduced by the source UEs, overall delivered bit-rate in entire uplink-downlink is higher for MRT-HQPS. This means that although the introduced delay leads to improved performance but not necessarily lower bit deliveries.

TABLE 3

Performance compassion on final achieved figures

| Scheduling Type | Downlink: MQPS Uplink: Time Scheduling (Aloha-like) | Downlink: MQPS Uplink: MRT-HQPS |
|---|---|---|
| Offered Load (Admitted packet load) | 1.286 Mbps | 1.178 Mbps |
| Delivered Bit Rate | 1.0616 Mbps | 1.068 Mbps |
| Packet Delivery Success Rate (Total Throughput Ratio) | 0.8251 | 0.9073 |
| Average Throughput | 0.9623 | 0.9804 |
| 95 Percentile Delay (Video) | 0.84 sec | 0.42 sec |
| Average Delay (Video) | 0.18155 | 0.0952 |
| Total Average Delay | 2.235 | 2.191 |
| Satisfied QoS Conditions (WWW) | 0.6277 | 0.6579 |
| Satisfied QoS Conditions (Video) | 0.8206 | 0.8822 |

It can be seen in Table 1 that almost all aspects involved in a successful QoS provisioning are improved simultaneously by applying the proposed MRT-HQPS in the uplink. Perhaps the most significant achievement is the improvement of 95 percentile delays for real-time video services which is reduced by half. This is vital for UEs and handsets which support conversational continuous real-time services such as video or voice. It can be seen in Table 3 that, while Aloha-like scheduling has admitted 1.286 Mbps which is higher than MRT-HQPS that admitted 1.178 Mbps, the delivered bit rates are almost same. This is another important achievement which is an enhancement of the ratio of success of packet delivery. As mentioned before in this experiment, only time scheduling aspects of MRT-HQPS were included. Therefore the current example mostly works as a congestion control algorithm mainly performed by source UEs at uplink when they change their delay elasticity. Significantly higher bit rates, better fairness, better QoS, better 95% percentile delay and better packet delivery success ratios are expected, if full MRT-HQPS is supported and source UEs are allowed to increase their transmission rates by switching to higher MCS levels.

Other Embodiments

In other embodiments of the invention the destination UEs are not in the same cell as the source UEs. In this case a destination UE is reached via a network, such as a radio network subsystem, a core network, a public switched network, or an IP-based network. In this case the reports from the destination UEs are sent back via the network, for example in a control channel.

A source UE may be in communication with two or more base stations at any one time (soft handover). In this case, the source UE receives credit values from each of the active base stations. The user equipment may either pick one of these values for the purposes of uplink scheduling, or it may combine the values, for example, by taking an average.

It will be understood that the present invention has been described above purely by way of example, and modifications of detail can be made within the scope of the invention. The various embodiments which have been described above may be implemented using software modules running on a processor, for example a digital signal processor, or any other type of processor. The programming of such modules will be apparent to the skilled person from the description of the various functions. The skilled person will appreciate that such modules may be programmed on any appropriate processor using any appropriate programming language. Alternatively, some or all of the functions described above may be implemented using dedicated hardware.

The invention claimed is:

1. A method of transmitting data packets in an uplink from a plurality of source user equipments to a base station, the data packets being for onward transmission to a plurality of destination user equipments, the method comprising:
   the base station determining a measure of a quality of service from the base station to the plurality of destination user equipments; and
   scheduling uplink transmissions from the source user equipments to the base station in dependence on the measure of a quality of service from the base station to the plurality of destination user equipments,
   wherein the scheduling is with greater priority for one of the plurality of destination user equipments whose downlink quality of service is relatively high than another of the plurality of destination user equipments whose downlink quality of service is relatively low, and
   wherein the plurality of source user equipments transmit the data packets in the uplink to the base station for onward transmission to the plurality of destination user equipments.

2. The method according to claim 1, wherein the base station transmits an indication of the quality of service to a source user equipment, in the plurality of source user equipments.

3. The method according to claim 1, wherein the base station transmits to a source user equipment, in the plurality of source user equipments, an indication of a transmission format to be used by the source user equipment.

4. The method according to claim 1, wherein the base station determines the measure of the quality of service for each of the plurality of destination user equipments.

5. The method according to claim 4, wherein the base station determines a credit value for each destination user equipment, the credit value being based on the measures of the quality of service, and the base station transmits each credit value to a corresponding source user equipment, in the plurality of said source user equipments.

6. The method according to claim 5, wherein the credit value for said each destination user equipment is obtained by comparing the measure of the quality of service for one destination user equipment with measures of the quality of service for other destination user equipments, in the plurality of said destination user equipments.

7. The method according to claim 5, wherein a new credit value is periodically determined and sent to the source user equipment, in the plurality of said source user equipments.

8. The method according to claim 1, wherein a plurality of different measures of the quality of service are determined for each of the plurality of destination user equipments.

9. The method according to claim 8, wherein, for said each of the destination user equipments, the base station compares each of the measures of the quality of service for a destination user equipment with the corresponding measures of the quality of service for other destination user equipments, in the plurality of the destination user equipments, to give a plurality of relative measures.

10. The method according to claim 9, wherein the base station obtains at least one of the following relative measures:
(a) distance from average throughput ratio
(b) distance from minimum throughput ratio
(c) distance from minimum quality of service
(d) distance from minimum buffer length.

11. The method according to claim 9, wherein the base station combines the plurality of relative measures for said each destination user equipment to give a single credit value for that destination user equipment.

12. The method according to claim 1, wherein at least one of the following measures of the quality of service for packet delivery from the base station to a destination user equipment is determined:
(a) throughput ratio
(b) ratio of satisfied packets
(c) base station buffer occupancy.

13. The method according to claim 1, wherein a source user equipment, in the plurality of source user equipments, receives a credit value based on the measure of the quality of service, and determines a time and/or rate of packet transmission based on the credit value.

14. The method according to claim 13, wherein the source user equipment determines the time and/or rate of packet transmission based additionally on a measurement of radio channel conditions.

15. The method according to claim 13, wherein the source user equipment determines the time and/or rate of packet transmission based additionally on the type of service.

16. The method according to claim 1, wherein the uplink transmissions are scheduled using rate scheduling.

17. The method according to claim 1, wherein the uplink transmissions are scheduled using hybrid rate-time scheduling.

18. The method according to claim 1, further comprising switching from scheduling the uplink transmissions using one of rate scheduling and hybrid rate-time scheduling to scheduling the uplink transmissions using the other of rate scheduling and hybrid rate-time scheduling.

19. The method according to claim 1, wherein a rate of an uplink transmission is varied by adjusting a modulation and coding scheme level.

20. The method according to claim 1, wherein a rate of an uplink transmission is varied by adjusting intervals at which the uplink transmissions take place.

21. The method according to claim 1, wherein a source user equipment, in the plurality of source user equipments, receiving an indication of a good quality of service transmits data packets to the base station at a lower rate than would otherwise be the case.

22. The method according to claim 1, wherein a source user equipment, in the plurality of source user equipments, receiving an indication of a poor quality of service transmits data packets to the base station at a higher rate than would otherwise be the case.

23. The method according to claim 1, wherein a source user equipment, in the plurality of source user equipments, receives credit values based on measures of the quality of service, and stores a history of the credit values.

24. The method according to claim 23, wherein a source user equipment, in the plurality of source user equipments, with a worsening history of credit values transmits data packets to the base station at a higher rate than would otherwise be the case.

25. The method according to claim 23, wherein a source user equipment, in the plurality of source user equipments, with an improving history of credit values transmits data packets to the base station at a lower rate than would otherwise be the case.

26. The method according to claim 1, wherein the base station operates a scheduling mechanism for downlink transmissions.

27. The method according to claim 1, wherein the base station transmits the data packets directly to the plurality of destination user equipments.

28. The method according to claim 1, wherein the base station transmits the data packets to the plurality of destination user equipments via a network.

29. A base station for receiving data packets in an uplink from a plurality of source user equipments for onward transmission to a plurality of destination user equipments, the base station comprising:
a determining unit which determines a measure of a quality of service from the base station to the plurality of destination user equipments;
a producing unit which produces a credit value based on the measure of the quality of service from the base station to each of the plurality of destination user equipments; and
a transmitting unit which transmits the credit value to a corresponding one of the plurality of source user equipments,
wherein scheduling based on the credit value is performed with greater priority for one of the plurality of destination user equipments whose downlink quality of service is relatively higher than another of the plurality of destination user equipments whose downlink quality of service is relatively lower.

30. A base station for receiving data packets in an uplink from a plurality of source user equipments for onward transmission to a plurality of destination user equipments, the base station comprising:
a determining unit which determines a measure of a quality of service from the base station to the plurality of destination user equipments;

a determining unit which determines, based on the measure of a quality of service from the base station to the plurality of destination user equipments, a transmission format to be used by a user equipment, in the plurality of source user equipments, in scheduling uplink transmissions from the user equipment to the base station; and a transmitting unit which transmits to the user equipment an indication of the transmission format to be used by the user equipment, wherein scheduling to the plurality of destination user equipments is performed with greater priority for one of the plurality of destination user equipments whose downlink quality of service is relatively higher than another of the plurality of destination user equipments whose downlink quality of service is relatively lower.

31. A user equipment for transmitting data packets in an uplink to a base station for onward transmission to a plurality of destination user equipments, the user equipment comprising:

a receiving unit which receives from the base station a credit value, the received credit value being an indication of a quality of service from the base station to a destination user equipment, in the plurality of destination user equipments; and a scheduling unit which schedules uplink transmissions from the user equipment to the base station in dependence on the received credit value, wherein the scheduling is with greater priority for one of the plurality of destination user equipments whose downlink quality of service is relatively higher than another of the plurality of destination user equipments whose downlink quality of service is relatively lower.

32. A communications system comprising:

a base station for receiving data packets in an uplink from a plurality of source user equipments for onward transmission to a plurality of destination user equipments, the base station comprising:

a determining unit which determines a measure of a quality of service from the base station to a destination user equipment, in the plurality of destination user equipments;

a producing unit which produces a credit value based on the measure of the quality of service; and a transmitting unit which transmits the credit value to a source user equipment; and the plurality of source user equipments, each being adapted to transmit data packets in an uplink to the base station for onward transmission to the plurality of destination user equipments, and each said source user equipment, in the plurality of said source user equipments, comprising:

a receiving unit which receives from the base station said credit value, the credit value being an indication of the quality of service from the base station to a destination user equipment, in the plurality of said destination user equipments; and a scheduling unit which schedules uplink transmissions from the user equipment to the base station in dependence on the credit value.

33. A communications system comprising:

a base station for receiving data packets in an uplink from a plurality of source user equipments for onward transmission to a plurality of destination user equipments, the base station comprising:

a determining unit which determines a measure of a quality of service from the base station to the plurality of destination user equipments;

a determining unit which determines, based on the measure of a quality of service, a transmission format to be used by a source user equipment, in the plurality of source user equipments in scheduling uplink transmissions from the source user equipment to the base station; and a transmitting unit which transmits to the source user equipment an indication of the transmission format to be used by the source user equipment;

the plurality of said source user equipments, each being adapted to transmit data packets in an uplink to the base station for onward transmission to the plurality of said destination user equipments, and each said source user equipment comprising:

a receiving unit which receives from the base station said indication of the transmission format; and a scheduling unit which schedules the uplink transmissions from each said source user equipment to the base station, wherein the scheduling is with greater priority for one of the plurality of destination user equipments whose downlink quality of service is relatively higher than another of the plurality of destination user equipments whose downlink quality of service is relatively lower.

* * * * *